Patented Oct. 18, 1949

2,485,297

UNITED STATES PATENT OFFICE 2,485,297

HYDROCARBON EMULSION

Charles J. G. Leesemann, Baytown, Tex., assignor, by mesne assignments, to Standard Oil Development Company, Elizabeth, N. J., a corporation of Delaware No Drawing. Application August 23, 1947, Serial No. 770,334

2 Claims. (Cl. 252—310)

The present invention is directed to a method for forming stable emulsions. More particularly, it is concerned with the production of emulsions comprising hydrocarbons in water in which a stabilizer for the emulsions is employed.

Emulsions are frequently encountered in industry and are sometimes considered to be a nuisance. On the other hand, industry sometimes deliberately forms emulsions and markets products in the form of stable emulsions. In this respect may be mentioned insecticidal compositions including oily bases and water, skin lotions, ointments and salves, paper sizing emulsions, emulsified wax compositions, cutting oil emulsions, disinfectants, and many more too numerous to mention here.

Besides the uses to which emulsions are put, as exemplified above, the petroleum industry encounters emulsions in the refining of petroleum. For example, in solvent extraction the formation of emulsions is a good way of insuring contact between immiscible fluids, such as a hydrocarbon which is being solvent extracted by a solvent which is immiscible in the hydrocarbon. As an example of another type of emulsions may be mentioned the emulsions of alkali metal hydroxide and hydrocarbons such as result when sodium hydroxide is employed to treat a hydrocarbon. As an example of another type of emulsion which is encountered in petroleum refining may be mentioned the emulsions of sulfuric acid and hydrocarbons which are deliberately formed when olefins are alkylated with isoparaffins in the presence of sulfuric acid.

It will be recognized that these emulsions do not remain emulsions for any period of time and sometimes it is desirable to stabilize the emulsions. In the case of the insecticidal compositions, the emulsions including skin lotion, ointments and salves, paper sizing emulsions, waxes, cutting oil emulsions and disinfectants, emulsions must be stabilized to remain in an emulsified condition.

It is, therefore, one object of the present invention to provide a stable emulsion of hydrocarbon and water.

Another object of the present invention is to provide a method for forming an emulsion of an oily material and water.

A still further object of the present invention is to provide a method for breaking emulsions of the type mentioned before.

The objects of the present invention may be achieved by forming an emulsion of a hydrocarbon, for example, a hydrocarbon boiling in the gasoline boiling range, that is to say below about 400° F., by agitating the hydrocarbon with a mixture including 70% to 90% of a saturated aqueous solution of a hydroxy benzoic acid and 30% to 10% of a ketone. Emulsions formed in this manner are stable and remain in emulsified condition for substantial periods of time. The emulsions may be resolved by adding to them an excess amount of the ketone.

Briefly, then, the present invention may be described as a method for preparing emulsions which includes the steps of forming a mixture of a critical concentration of a saturated aqueous solution of a hydroxy benzoic acid, such as salicylic acid, and a ketone such as commercial acetone. The mixture of the aqueous solution of hydroxy benzoic acid and ketone may then be agitated with a hydrocarbon to be emulsified, the proportions of the hydrocarbon and the mixture of salicylic acid solution and ketone being relatively equal, but some leeway in this respect is allowed, such as for example, the hydrocarbon may comprise 40% to 60% of the emulsion and the mixture of salicylic acid and ketone solution may be 60% to 40% of the emulsion.

Preferably, the emulsions formed in accordance with the present invention may be produced by agitating the ingredients of the emulsions together at substantially atmospheric temperature and pressure. In fact, reducing the temperature is conducive to the formation of emulsions and elevation of the temperature may result in resolution of the emulsions. Ordinarily, however, the emulsion may be formed at substantially atmospheric temperature.

As mentioned before, the formation of an emulsion in accordance with the present invention is dependent on the concentration of the ketone being below about 30% and above about 10% in the mixture of saturated hydroxy benzoic acid solution forming a component of the emulsion. If the concentration of the ketones in the mixture is below about 10% and above 30%, emulsification is not realized. It will thus be seen that resolution of an emulsion may be readily obtained by adjusting upwardly the concentration of ketone in the emulsion. As a result of adjusting the concentration of ketone in the aqueous phase of the emulsion, hydrocarbon and aqueous phases may be caused to separate and the hydrocarbon phase recovered from the aqueous phase, following which the hydrocarbon may be distilled to separate it from the mixture of hydrocarbon and ketone.

The invention will now be illustrated by the following examples in which chemically pure benzene was agitated with water and aqueous saturated solution of salicylic acid and acetone, and mixtures of these, at room temperature:

Example 1

50 volumes of benzene and 50 volumes of water were vigorously agitated together for one minute. Separation of the phases was achieved almost immediately.

Example 2

In this example, 50 volumes of benzene were agitated vigorously with 50 volumes of acetone and as a result a single homologous phase occurred.

Example 3

50 volumes of benzene were then agitated vigorously with 50 volumes of a saturated aqueous solution of salicylic acid. Emulsification occurred immediately and phase separation resulted in about 15 minutes.

Example 4

50 volumes of benzene were then agitated vigorously with a mixture of 45 volumes of a saturated salicylic acid solution and 5 volumes of commercial acetone. Emulsification occurred and the first evidence of phase separation was noted only after the emulsion had stood for 55 minutes. Complete separation between aqueous and hydrocarbon phases had not occurred after two hours.

Example 5

50 volumes of benzene were then agitated vigorously with 40 volumes of salicylic acid solution and 10 volumes of acetone. Emulsification again occurred and the first evidence of phase separation was not observed until after the emulsion had stood for 65 minutes. Complete phase separation had not occurred after two hours standing.

Example 6

50 volumes of benzene were agitated vigorously with 30 volumes of saturated salicylic acid solution and 20 volumes of acetone. With this solution, emulsification was not achieved and complete phase separation was observed immediately after agitation was terminated.

Example 7

When the emulsion of 50 volumes of benzene and 45 volumes of salicylic acid and 5 volumes of acetone mentioned in Example 4 were agitated again with an additional 15 volumes of acetone, complete phase separation and emulsion breaking occurred immediately. 53 volumes of aqueous layer and 62 volumes of hydrocarbon layer were recovered.

Example 8

When the emulsion resulting from the mixing of 50 volumes of benzene and 40 volumes of salicylic acid solution and 10 volumes of acetone formed in Example 5 was agitated with an additional 10 volumes of acetone, complete phase separation and emulsion breaking occurred immediately. Forty-nine volumes of aqueous layer and 61 volumes of hydrocarbon layer were recovered.

In the following examples, a hydrocarbon fraction comprising a substantial amount of hexane was agitated with water, with a saturated aqueous solution of salicylic acid, acetone, and mixtures of these materials:

Example 9

In this example, 50 volumes of the hexane fraction were agitated vigorously with 50 volumes of water. No emulsification of the hexane fraction occurred and phase separation was noted nearly immediately after agitation subsided.

Example 10

50 volumes of hexane fraction were agitated vigorously with 50 volumes of acetone, resulting in a complete solution of the hexane in the acetone.

Example 11

50 volumes of hexane fraction were then agitated with 50 volumes of saturated aqueous solution of salicylic acid. As a result, emulsification occurred but the emulsion began breaking immediately and phase separation was complete in 10 minutes.

Example 12

50 volumes of hexane fraction were agitated vigorously with 45 volumes of saturated salicylic acid solution and 5 volumes of commercial acetone. Emulsification occurred and the first evidence of phase separation occurred after 10 minutes standing of the emulsion. Complete separation of the emulsion had not been obtained after the emulsion had stood for 55 minutes.

Example 13

50 volumes of the hexane fraction were then agitated with 40 volumes of the saturated salicylic acid solution and 10 volumes of acetone. Emulsification occurred and no evidence of phase separation was observed after the emulsion had stood for 30 minutes. Separation of phases had not occurred after the emulsion had been allowed to stand for 2 hours.

Example 14

50 volumes of hexane fraction were agitated vigorously with 30 volumes of the salicylic acid solution and 20 volumes of commercial acetone. No emulsification occurred and phase separation resulted nearly immediately after agitation had ceased.

Example 15

In this example, 15 volumes of acetone were added to the emulsion resulting when 50 volumes of hexane fraction were agitated with 45 volumes of salicylic acid and 5 volumes of acetone as described in Example 12. Complete phase separation occurred immediately.

Example 16

In this example, 10 volumes of acetone were added to the emulsion resulting when 50 volumes of hexane, 40 volumes of salicylic acid solution and 10 volumes of acetone were agitated as described in Example 13. As a result of adding the additional acetone to the emulsion, complete phase separation occurred immediately.

Example 17

In this example one-half volume of a solution of 35 parts of technical dichloro diphenyl trichloroethane in 60 parts of benzene were added to 86.8 volumes of water and the mixture agitated for one minute. After standing for about 5 minutes, the solution began separating into aqueous and hydrocarbon phases. After about 15 minutes, 75 per cent of the hydrocarbon had separated from the aqueous phase.

Example 18

In this example, one-half volume of the same solution of dichloro diphenyl trichloroethane in 60 volumes of benzene were added to 86.3 volumes of a solution comprised of 85% of a saturated aqueous solution of salicylic acid and 20% of commercial acetone and the mixture agitated for one minute. After the emulsion resulting from the agitating had stood for 30 minutes, no evidence of phase separation had occurred. After the emulsion had stood for 1½ hours, approximately 25% of the hydrocarbon had separated. The remaining resultant aqueous layer was a milky emulsion.

It will be seen from the foregoing examples that the concentration of the ketones in the mixture is critical and when the concentration varies appreciably from the critical range given, emulsions are not formed. It will be seen that a method for producing and breaking emulsions has been discovered.

While the invention has been illustrated by examples in which salicylic acid and acetone are employed in stabilizing and breaking emulsions, it will be apparent to the skilled worker that other hydroxy benzoic acids besides salicylic acid, such as the meta- and para-hydroxy benzoic acids may be used in lieu of salicylic acid. As still further examples of hydroxy benzoic acids useful in the present invention may be mentioned the di-hydroxy benzoic acids, such as o-pyrocatechuic acid, alpha, beta, and gamma resorcylic acid, protocatechuic acid, gentesic acid, and the xylic acids.

As examples of the ketones besides acetone may be mentioned methyl ethyl ketone.

The ketones are employed quite extensively in petroleum refining. For example, acetone is employed to separate butylenes from mixtures with other $C_4$ hydrocarbons. Consequently, it is intended that the present invention may be employed in solvent extractions in which ketones are used as the solvent. It will thus be possible to form an emulsion by providing an aqueous saturated solution of a hydroxy benzoic acid, mixing the solution with acetone and employing the mixture as a solvent for separating types of hydrocarbons. The resulting emulsion will insure good contact between the solvent mixture and the hydrocarbon which may readily be resolved by adding additional acetone to the resulting emulsion.

The method described in this application has been described and claimed in my co-pending divisional application entitled "Method for breaking emulsions," filed June 28, 1948, Serial No. 35,740.

The nature and objects of the present invention having been fully described and illustrated, what I wish to claim as new and useful and to secure by Letters Patent is:

1. An emulsion comprising a substantially equal quantity of a hydrocarbon boiling in the gasoline boiling range and a mixture including a major amount of a saturated aqueous solution of a hydroxy benzoic acid and a minor amount of a ketone selected from the class consisting of acetone and methyl ethyl ketone said major amount being in the range between 70% and 90% of said mixture and said minor amount being in the range between 30% and 10% of said mixture.

2. An emulsion in accordance with claim 1 in which the hydroxy benzoic acid is salicylic acid.

CHARLES J. G. LEESEMANN.

REFERENCES CITED

The following references are of record in the file of this patent:

UNITED STATES PATENTS

| Number | Name | Date |
|---|---|---|
| 2,428,844 | Gertler | Oct. 14, 1947 |
| 2,420,295 | Biehm | May 13, 1947 |
| 2,404,913 | Leiserson | July 30, 1946 |
| 2,287,567 | Porter | June 23, 1942 |
| 1,790,070 | Oliver | Jan. 27, 1931 |
| 1,589,331 | Sheppard et al. | June 15, 1926 |

FOREIGN PATENTS

| Number | Country | Date |
|---|---|---|
| 547,871 | Great Britain | Sept. 15, 1942 |